(12) United States Patent
Biermann (10) Patent No.: US 7,081,836 B2
(45) Date of Patent: Jul. 25, 2006

(54) METHOD AND APPARATUS FOR COVERTLY DETECTING AND REPORTING A DISTRESS CONDITION IN A VEHICLE CONTROL CABIN

(75) Inventor: Paul J. Biermann, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 137 days.

(21) Appl. No.: 10/888,460

(22) Filed: Jul. 9, 2004

(65) Prior Publication Data
US 2006/0007020 A1  Jan. 12, 2006

(51) Int. Cl.
G08B 21/00 (2006.01)

(52) U.S. Cl. .......... 340/945; 340/573.1; 340/573.4; 340/572.1; 340/426.12

(58) Field of Classification Search ............. 340/573.1, 340/573.4, 574, 426.11, 426.12, 945, 429, 340/541, 963, 988, 425.5, 568.1; 244/118.5, 244/129.1, 118.6, 129.5; 342/42, 60, 51, 342/36
See application file for complete search history.

(56) References Cited

U.S. PATENT DOCUMENTS

| | | | |
|---|---|---|---|
| 3,954,100 A | 5/1976 | Sem-Jacobsen | |
| 4,488,370 A | 12/1984 | Lemelson | |
| 4,706,091 A | 11/1987 | Scott | |
| 4,797,657 A | 1/1989 | Vorzimmer et al. | |
| 4,857,893 A | 8/1989 | Carroll | |
| 5,159,344 A | 10/1992 | Robinson et al. | |
| 5,461,812 A | 10/1995 | Bennett | |
| 5,621,388 A | 4/1997 | Sherburne et al. | |
| 5,933,098 A | 8/1999 | Haxton | |
| 6,232,877 B1 * | 5/2001 | Ashwin | 340/572.1 |
| 6,474,599 B1 | 11/2002 | Stomski | |
| 6,573,839 B1 | 6/2003 | Kimmet | |
| 6,771,168 B1 * | 8/2004 | Nguyen | 340/426.17 |
| 6,882,288 B1 * | 4/2005 | Weigl | 340/945 |
| 6,919,808 B1 * | 7/2005 | Longere | 340/576 |
| 6,946,950 B1 * | 9/2005 | Ueno et al. | 340/10.1 |
| 6,956,472 B1 * | 10/2005 | Walcott et al. | 340/505 |
| 2003/0052799 A1 * | 3/2003 | Weigl | 340/945 |
| 2003/0062447 A1 | 4/2003 | Cordina et al. | |
| 2003/0189488 A1 * | 10/2003 | Forcier et al. | 340/572.1 |
| 2004/0107028 A1 * | 6/2004 | Catalano | 701/2 |
| 2004/0201499 A1 * | 10/2004 | Understein | 340/945 |
| 2005/0219064 A1 * | 10/2005 | Arnouse | 340/945 |
| 2005/0280504 A1 * | 12/2005 | Pettus | 340/10.1 |

* cited by examiner

Primary Examiner—Jeffery Hofsass
Assistant Examiner—Hoi C. Lau
(74) Attorney, Agent, or Firm—Albert J. Fasulo, II (57) ABSTRACT

A method of covertly detecting and reporting a distress condition in a control cabin of a vehicle, the cabin having designated areas expected to be occupied by respective operators under normal operating conditions of the vehicle. The method comprises (a) attaching to each operator a transponder tag configured to wirelessly transmit a response signal, unique to the operator to which it is attached, responsive to an interrogator signal; (b) wirelessly transmitting interrogator signals into the designated areas; (c) attempting to detect response signals, if any, from the transponder tags; and (d) if all of the response signals are concurrently not detected, then wirelessly transmitting a distress signal from the vehicle.

22 Claims, 7 Drawing Sheets

METHOD AND APPARATUS FOR COVERTLY DETECTING AND REPORTING A DISTRESS CONDITION IN A VEHICLE CONTROL CABIN

CROSS-REFERENCE TO RELATED APPLICATIONS

This application relates to U.S. Provisional Application Ser. No. 60/432,524, filed Dec. 11, 2002, which is incorporated herein by reference in its entirety.

BACKGROUND OF THE INVENTION

1. Field of the Invention

The present invention relates to detecting and reporting emergency distress conditions in a control cabin of a transportation vehicle.

2. Background

Since 9/11, terrorist attacks directed against mass transportation vehicles, such as airplanes, trains and even buses, have increased in frequency with often devastating results. This disturbing trend seems likely to continue into the foreseeable future. Typically, a transportation vehicle includes a control cabin having vehicle operators occupying designated areas during normal operating conditions of the vehicle. Terrorists must breach the control cabin, and often remove the operators from their designated areas, in order to rest control of the vehicle from the operators. The operators may be powerless to notify others of the attack, or even killed attempting to do so. Thus, in a transportation vehicle housing operators, there is an ever pressing need to covertly detect and report emergency conditions, such as an unauthorized breach of the control cabin, or the unauthorized removal of all of the operators from their designated areas, by terrorists.

SUMMARY OF THE INVENTION

An embodiment of the present invention includes a method of covertly detecting and reporting a distress condition in a control cabin of a vehicle, the cabin having designated areas expected to be occupied by respective operators under normal operating conditions of the vehicle. The method comprises (a) attaching to each operator a transponder tag configured to wirelessly transmit a response signal, unique to the operator to which it is attached, responsive to an interrogator signal; (b) wirelessly transmitting interrogator signals into the designated areas; (c) attempting to detect response signals, if any, from the transponder tags; and (d) if all of the response signals are concurrently not detected, then wirelessly transmitting a distress signal from the vehicle.

Further method, system and apparatus embodiments are apparent from the description below.

BRIEF DESCRIPTION OF THE DRAWINGS

Various embodiments are described below with reference to the drawings.

DETAILED DESCRIPTION OF THE PREFERRED EMBODIMENT(S)

A transportation vehicle typically includes a control cabin having designated areas expected to be occupied by operators under normal operating conditions of the vehicle. The present invention presents a method and apparatus/system for detecting and reporting an emergency or distress condition in the control cabin, such as, but not limited to, an unauthorized absence of the operators from their designated areas, or an unauthorized intrusion into the cabin by, for example, a terrorist, as will be described below by way of an airplane example. It is to be understood that the present invention may operate in connection with any mass transportation vehicle, such as a train, bus, cruise ship, etc., having a control cabin occupied by multiple operators.

Figure 1:
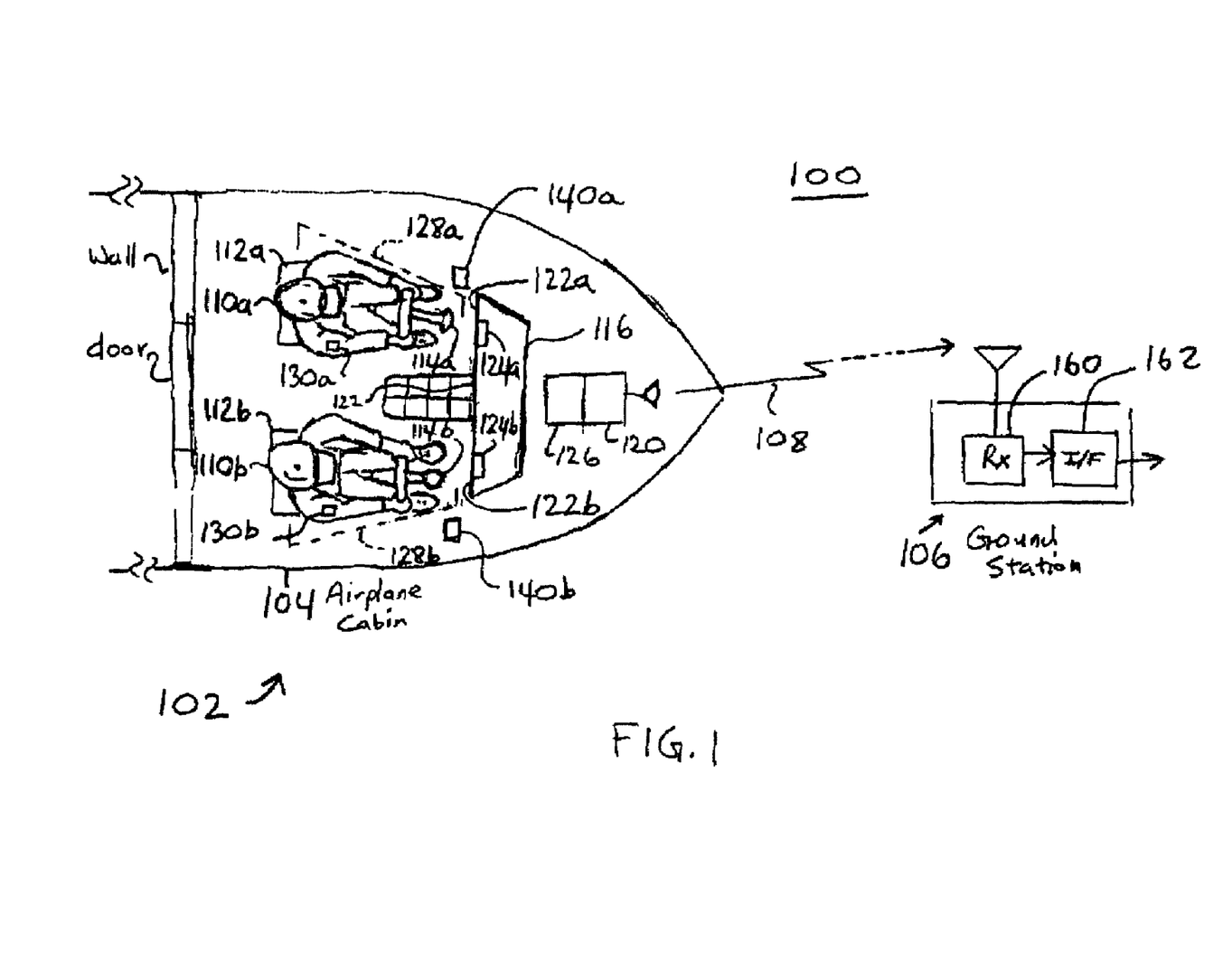
FIG. 1 is an example transportation system or environment in which the present environment can operate.

FIG. 1 is an illustration of an example transportation system or environment 100 in which the present environment can operate. System 100 includes an aircraft 102 depicted in flight, and a ground station 106, such as an air traffic control tower. Depicted in FIG. 1 is a top interior view of a control cabin or cockpit 104 of airplane 102.

Under normal flight operating conditions, pilots 110a and 110b occupy respective seats 112a and 112b in cabin 104. Pilots 110 control aircraft 102 through flight control sticks 114, and cockpit control console 116. Cabin 104 also includes a radio 120 for wirelessly transmitting messages to and receiving messages from ground station 106 over a radio link 108. Control console 116 includes a console face 122 having portions 122a and 122b facing respective seats 112a and 112b, thereby defining respective designated areas or regions 128a and 128b. Under normal flight conditions, pilots 10a and 110b occupy respective designated areas 128a and 128b. Although only two pilots are depicted, more pilots and corresponding designated areas may be present in any given embodiment.

Arranged in cabin 104 are the following components constructed and operated in accordance with the present invention to covertly detect and report an emergency condition in the cabin: radio 120, interrogator units 124, transponder tags 130, optional cabin-mounted panic buttons 140 and a control module 126, which communicates with radio 120. The present invention is intended to uncover covertly emergency conditions such as, but not limited to, the forcible removal of all of pilots 110 from their seats, i.e., from their designated areas 128, and the intrusion into cabin 104 of an unauthorized person, such as a terrorist, for example.

Figure 2:
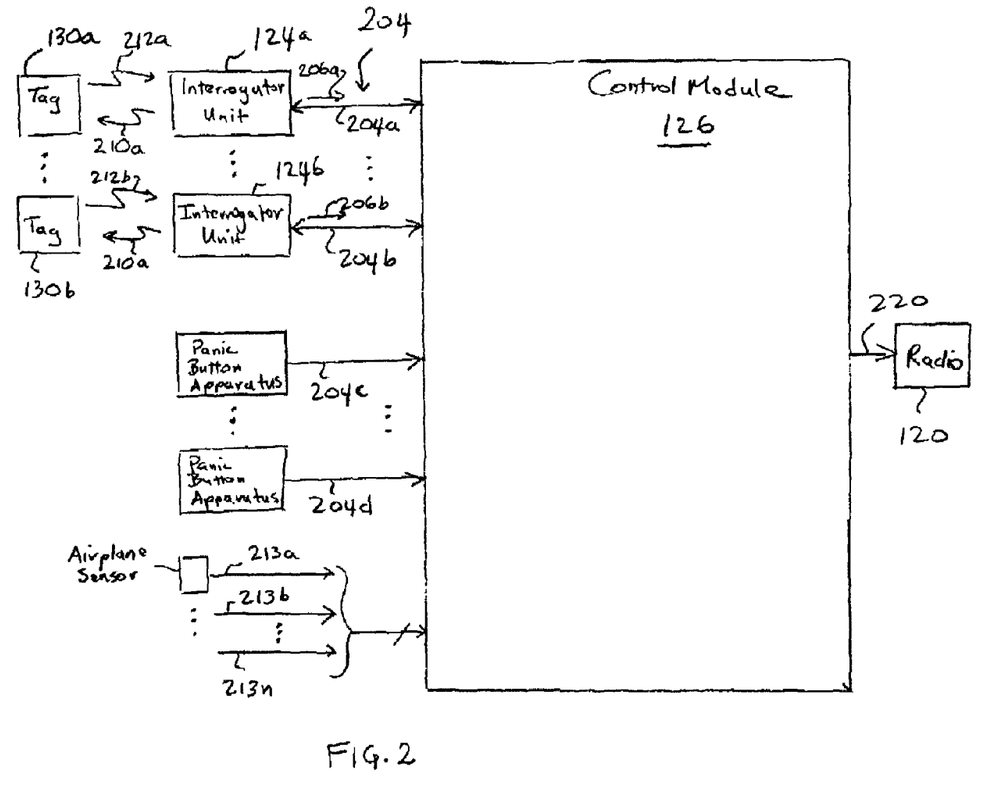
FIG. 2 is a schematic block diagram of an example system of the present invention, corresponding to the arrangement depicted in FIG. 1.

FIG. 2 is a schematic block diagram of an example system 200 including interrogator modules 124, transponder tags 130, panic buttons 140, control module 126 and radio 120, corresponding to the arrangement depicted in FIG. 1. With reference to FIGS. 1 and 2, interrogator unit 124a, mounted to or within console face portion 122a, wirelessly transmits an interrogator signal 210a into designated area 128a. Interrogator unit 124a preferably transmits interrogator signal

210a (i) at a transmit power level sufficiently low, and (ii) with sufficient directivity within designated area 128a, so as to substantially limit the detectable range of the interrogator signal to that designated area. Similarly, interrogator unit 124b, mounted to console face portion 122b, wirelessly transmits an interrogator signal 210b into designated area 128b (i) at a transmit power level sufficiently low, and (ii) with sufficient directivity within designated area 128b, so as to substantially limit the detectable range of the interrogator signal to that designated area.

Pilots 110a and 110b wear respective transponder tags 130a and 130b paired with or corresponding to respective interrogator units 124a and 124b. Transponder tag 130a, if within the detectable range of interrogator signal 210a, i.e., if in designated area 128a, wirelessly transmits a response signal 212a uniquely encoded to identify pilot 110a, responsive to interrogator signal 210a. Similarly transponder tag 130b, if within the detectable range of interrogator signal 210b, i.e., if in designated area 128b, wirelessly transmits a response signal 212b uniquely encoded to identify pilot 110b, responsive to interrogator signal 210b. Interrogator units 124 process respective response signals 212.

Airplane cabin 104 also includes cabin-installed, mechanically, e.g., pressure, activated panic buttons 140a and 140b, which may be mounted, e.g., to a floor of cabin 104 near the feet of respective pilots 110a and 110b. Pilots 110 may strike, e.g., kick, panic buttons 140 to activate the panic buttons.

Control module 126 operates in accordance with the present invention to control system 200. Control module 126 includes one or more computer controllers, memory for storing computer code that the computer controller(s) execute, signal input/output interfaces, and so on, as is known. Control module 126 may be either a stand-alone unit, or included as part of, i.e., integrated with, existing airplane control computers. Control module 126 issues to radio 120 messages destined for ground station 102, and in turn, radio 120 wirelessly transmits the messages to the ground station. Radio 120 may be either a stand-alone radio, or a known cockpit radio, such as a transponder radio, equipped to receive and transmit the messages from control module 126 in accordance with the present invention.

Ground station 106 includes a radio 160 for receiving messages from and transmitting messages to airplane 102 over link 108. Ground station 106 also includes an operator interface 162 to display to ground station operators messages received over link 108, through radio 106, as is known.

Control module 126 also communicates with interrogator units 124 and panic buttons 140 over interface links 204, which may be wired or wireless. Control module 126 issues control commands to interrogator units 124, and interrogator units 124 issue messages 206 to control module 126, over corresponding interfaces 204. In particular, if either interrogator unit 124a or 124b stops receiving corresponding tag response signal 212a or 212b for more than a predetermined period of time, indicating that the corresponding tag 130a or 130b, and thus pilot 110a or 110b to which the tag is attached, is absent from designated area 128a or 128b, then that interrogator unit sends a "Response Signal Absent" (RSA) message to control module 126 indicating the absence of the response signal. Substantially contemporaneous or concurrent receipt of RSA messages from all interrogator units 124 indicates a concurrent absence of all of pilots 110 from designated areas 128. The RSA message represents a "results message" indicative of whether the interrogator unit detected a response signal. The concurrent absence of all of pilots 110 from designated areas 128 is considered an emergency condition. For example, all of pilots 110 may have been forcibly removed from their seats by a terrorist in a hijack scenario.

Additionally, control module 126 receives sensed signals 213a–213n from corresponding airplane component sensors, indicative of various conditions of the airplane. For example, sensed signal 213a indicates whether the aircraft engine(s) are ON or OFF, and sensed signal 213b indicates whether aircraft 102 is being supplied with ground power, for example, when the aircraft is parked and being serviced at an airport. Such sensed signals are available to cockpit electronics in conventional systems.

Figure 2A:
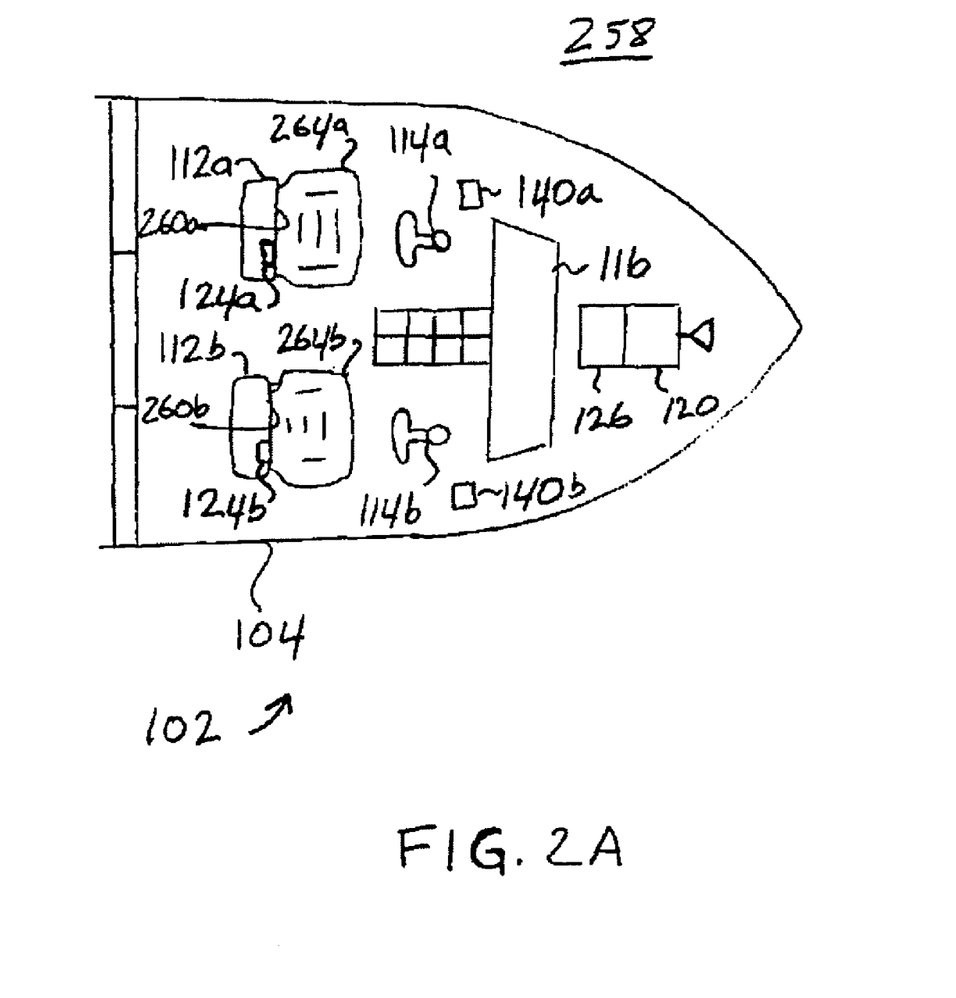
FIG. 2A is a block diagram of an example alternative arrangement of a system of the present invention.

FIG. 2A is a block diagram of an example alternative arrangement 258 of system 200 as depicted in cabin 104, wherein interrogator units 124a, 124b are mounted in respective back portions 260a, 260b of respective seats 112a, 112b, instead of in console portion 116. In arrangement 258, interrogator units 124a, 124b transmit signals 210a, 210b from seats 112a, 112b into designated areas 128a, 128b, respectively. In other arrangements, interrogator units 124 may be mounted to (i) lower horizontal seat portions 264 of seats 112, (ii) control sticks 114, or (iii) the floor of cabin 102 near, e.g., under the seats.

The operation of system 200 is now described. Initially, while airplane 102 is grounded at an airport, control module 126 monitors sensed signals 213a–213n. After take-off, control module 126 monitors interrogator units 124 over interface 204. Interrogator units 124 transmit interrogator signals 212 and listen for response signals 212.

Under normal airplane operating conditions, at least one pilot (e.g., pilot 110a) occupies his/her designated area (e.g., 128a). Thus, at least that pilot's transponder tag (e.g., tag 130a) transmits a response signal (e.g., signal 212a), and the corresponding interrogator unit (e.g., unit 124a) receives the response signal. Because of the continued presence of the response signal (e.g., signal 212a) the corresponding interrogator unit (e.g., unit 124a) will not send an RSA messages to control module 126. Thus, control module 126 will not receive substantially concurrent RSA messages from all of interrogator units 124. From this, control module 126 determines that an emergency condition does not exist in cabin 104, because at least one pilot occupies his/her designated area.

On the other hand, if control module 126 receives substantially concurrent RSA messages from all of interrogator units 124, indicating the concurrent absence of all tags 130, and thus pilots 110 to which the tags are attached, from their designated areas, then control module 126 determines an emergency condition exists in cabin 104, and initiates the sending of an "All Operators (e.g., Pilots) Absent" distress message to ground station 106. Ground station 106 presents the message to ground station operators. Thus, in this manner, system 200 automatically (i.e., without operator invention) detects and reports the emergency condition in cabin 104 in a covert manner.

Control module 126 also monitors an activation status of panic buttons 140. If control module 126 determines that either of panic buttons 140 are activated, for example, by a pilot striking one of the panic buttons, then control module 126 initiates the sending of a "Panic Button Activated" distress message to ground station 102. For example, pilot 110a may activate panic button 140a upon an unauthorized intrusion by an individual into cabin 104. Ground station 106 presents the message to ground station operators. Thus, in this manner, system 200 covertly reports the emergency condition in cabin 104.

Figure 3:
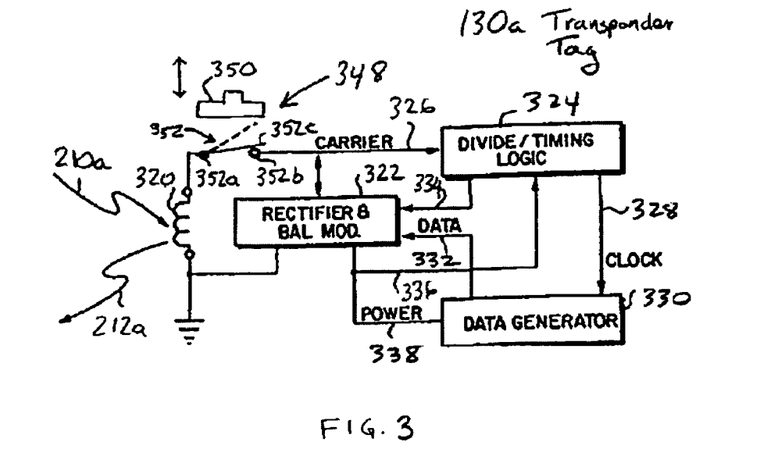
FIG. 3 is a block diagram of an example arrangement of a transponder from FIGS. 1 and 2.

FIG. 3 is a block diagram of an example arrangement of transponder tag 130a, which may be constructed on an integrated circuit chip. All of the transponder tags (e.g., tags 130a and 130b) may be substantially identical, with the exception that each tag generates a uniquely encoded response signal. Transponder tag 130a includes an antenna coil 320 for receiving interrogator signal 210a. In an embodiment, interrogator signal 210a is an RF carrier signal. Antenna coil 320 applies the RF carrier signal to a rectifier/balanced modulator circuit 322 and a divide/timing logic circuit 324 over a signal line 326.

Divide/timing logic circuit 324 divides the received carrier signal to generate a clock signal and a second carrier signal on an output signal line 328. The clock signal drives a data generator circuit 330, which generates an encoded data word. The encoded data word is unique to the transponder, and thus identifies the transponder. That is, each transponder tag has its own unique encoded data word.

The encoded data word is presented over signal line 332 to the rectifier/balanced modulator 322. Also presented to the rectifier/balanced modulator 322, over signal line 334, is a buffered carrier signal. The buffered carrier signal and the encoded data word are mixed in the rectifier/balanced modulator 322 to produce a uniquely encoded transmit signal that is presented on signal line 326 to antennal coil 320, from which it is transmitted as the responsive signal 212a.

Transponder tag 124a is a passive tag type transponder configured to derive its full operating power from interrogator signal 210a. To this end, rectifier/balance modulator 322 rectifies incoming RF carrier signal 210a to generate operating power used by the divide/timing logic circuit 324 and data generator 330. This operating power is distributed to these circuits over power lines 336 and 338, respectively.

Transponder tag 130a optionally includes a mechanically, e.g., pressure, activated panic button 348. Panic button 348 enables a user to disable transponder tag 130a, i.e., render the tag non-responsive, by, for example, simply striking the panic button. Panic button 348 includes a mechanical activation component 350 coupled with an electronic switch 352. Mechanical activation component 350 selectively opens or closes electronic switch 352 responsive to a pressure applied to the mechanical activation component. Electronic switch 352 includes (i) a contact 352a connected to antenna coil 320, (ii) a contact 352b, spaced from contact 352a, and connected to circuit 324, and (iii) a wiper 352c responsive to mechanical activation component 350. When mechanical activation component 350 closes electronic switch 352, wiper 352c electrically connects contact 352a to contact 352b (as depicted in solid line in FIG. 3), and thus antenna coil 320 to circuit 324. When switch 352 is closed, transponder 130a operates normally as described above. That is, transponder 130a is responsive to interrogator signal 210a.

On the other hand, when mechanical activation component 350 opens electronic switch 352, wiper 352c electrically disconnects contact 352a from 352b (as depicted in dotted-line in FIG. 3), and thus antenna coil 320 from circuit 324. When switch 352 is open, transponder 130a is unable to generate response signal 212a. That is, open switch 352 causes an open-circuit between antenna coil 320 and divide/timing logic circuit 324, which inhibits or disables responsive operation of transponder 130a.

Figure 4:
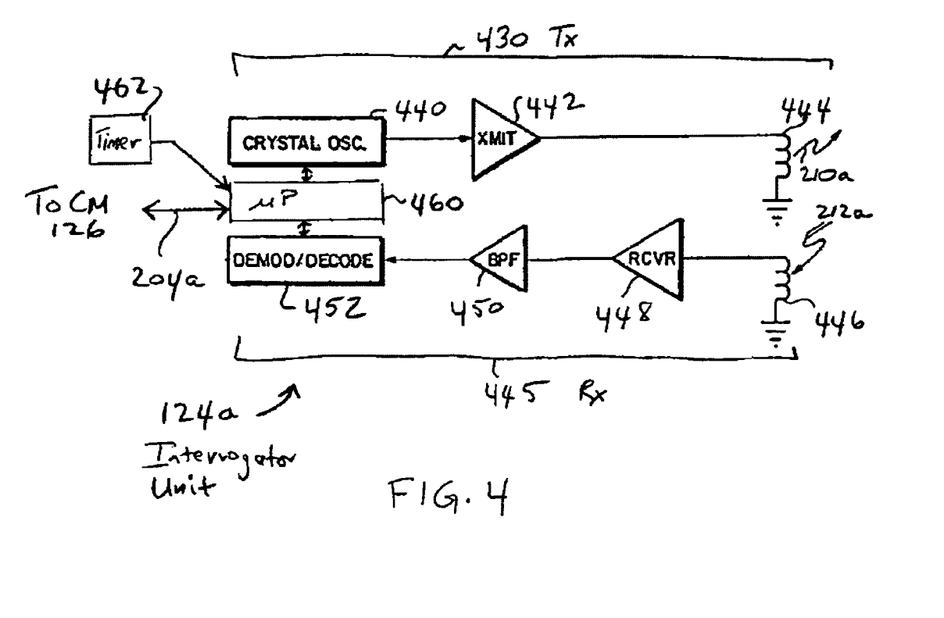
FIG. 4 is a block diagram of an example arrangement of an interrogator unit from FIGS. 1 and 2.

FIG. 4 is a block diagram of an example arrangement of interrogator unit 124a. All of the interrogator units (e.g., units 124a and 124b) may be substantially identical, with the exception that each interrogator unit recognizes its corresponding uniquely encoded data word, as described below.

Interrogator unit 124a includes a transmitter 430 for generating interrogator signal 210a at an approximate power level of 0.1 Watts or below, and an exemplary frequency in the range of about 800 to 1000 MegaHertz (MHz), although other powers and frequency ranges may be used. Transmitter 430 includes a crystal oscillator 440, appropriate transmitter circuitry 442, and a transmitter antenna or coil 444. Transmitter 430 may generate interrogator signal 210a as a pulsed RF signal having a relatively low duty cycle, for example. Alternatively, interrogator signal 210a may be a continuous RF signal. In an embodiment, antenna 444 is a directional antenna, such as a half-wavelength dipole, quad-loop, or other directional antenna, having a maximum gain, i.e., an antenna pattern main-lobe, directed toward seat 112a so as to overlap designated area 128a. A similar arrangement holds for transponder tag 130b, which has an antenna main-lobe directed toward seat 112b. In another embodiment, antenna 444 is not directional, i.e., antenna 444 is an omni-directional antenna.

Interrogator unit 124a also includes a receiver 445 for receiving response signal 212a. Interrogator unit 124a receives response signal 212a through an antenna coil 446 and receiver circuits 448 and 450 tuned to the RF frequency of response signal 212a. Receiver circuits 448 and 450 pass a conditioned received signal to a demodulator/decoder circuit 452. Demodulator/decoder 452 demodulates and decodes the received signal using known modulation and decoding techniques in order to extract the data word signal included in responsive signal 212a. This data word signal serves to identify the transponder unit (and thus pilot) from which it originated. Circuit 452 provides the recovered data word, if any, to an interrogator unit controller 460.

Interrogator unit controller 460 and a timer 462 operate together to control the operation of transmitter 430 and receiver 445. Controller 460 includes a memory for storing, inter alia, timing information, including a maximum predetermined time that response signal 212a can be absent before an RSA message must be issued by the controller. In an embodiment, controller 460 determines whether response signal 212a is present or absent based on whether the data word is present or absent. Controller 460 recognizes only the unique data word from the transponder tag with which the interrogator unit is paired, e.g., controller 460 of interrogator unit 124a recognizes only the unique data word from tag 130a, controller 460 of interrogator unit 124b recognizes only the unique data word from tag 130b, and so on. Controller 460 uses a timing signal from timer 462 to time the absences of the data word. When the data word has been absent for a time period that exceeds the maximum predetermined time allowed, then controller 460 issues an RSA message to control module 126 over interface 204. If and when controller 460 receives a next data word after such an absence, then controller 460 issues a reset message to computer module 126 indicating the presence of the response signal.

Except for the differences described above, each of interrogator units 124 and each of transponder tags 130 may be constructed substantially in accordance with controller/interrogator 12 and tag 14, respectively, described in detail in U.S. Pat. No. 4,857,893 to Carroll, incorporated herein by reference in its entirety.

Figure 5:
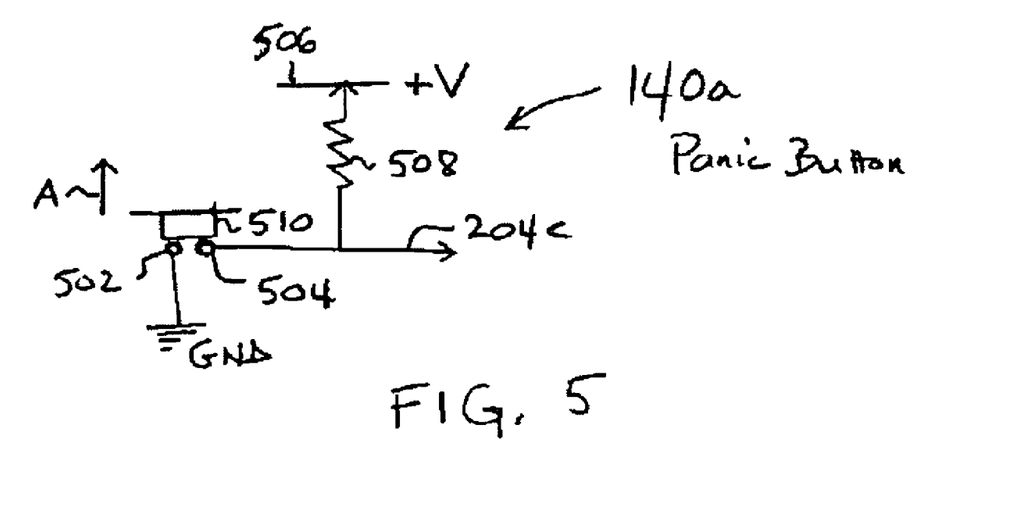
FIG. 5 is a circuit diagram of an arrangement of a cabin-mounted mechanically activated panic button from FIGS. 1 and 2.

FIG. 5 is a circuit diagram of an arrangement of cabin-mounted mechanically activated panic button 140a. Panic button 140a includes first and second spaced apart terminals 502 and 504. First terminal 502 is connected to a ground potential. A voltage rail 506 applies a rail voltage +V to second terminal 504 through a pull-up resistor 508. Panic button 140a also includes a movable, electrically conductive contact 510 having a first position corresponding to when panic button 140a is not activated, depicted in FIG. 5, wherein contact 510 electrically connects terminals 502 and 504. In this position, interface line 204c is held at the ground potential, i.e., is pulled-low. Contact 510 can be moved in a direction A away from terminals 502 and 504 to a second position corresponding to when panic button 140a is activated, e.g., by a pilot, thereby electrically disconnecting terminals 502 and 504. In this position, interface line 204c is raised to voltage +V, i.e., is pulled-high. Control module 126 determines when any of panic buttons 140 is/are activated. If any of panic buttons 140 is/are activated, control module 126 initiates the sending of a distress message, as mentioned above.

Figure 5A:
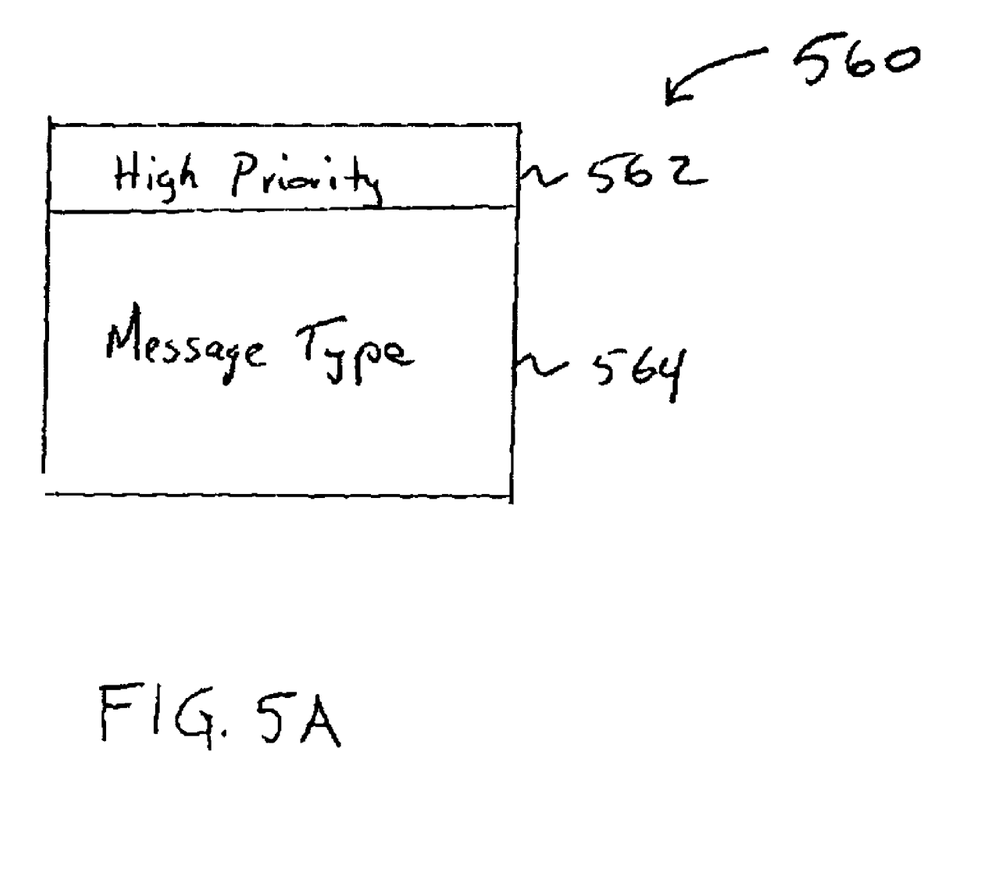
FIG. 5A is an example message format for a distress message transmitted from a vehicle of FIG. 1.

FIG. 5A is an example message format 560 for a distress message transmitted from radio 120. Format 560 includes a priority field 562 indicating a high priority or distress message. A second field 564 indicates the type of distress condition, e.g., All Pilots Absent, or Panic Button Activate.

Figure 6:
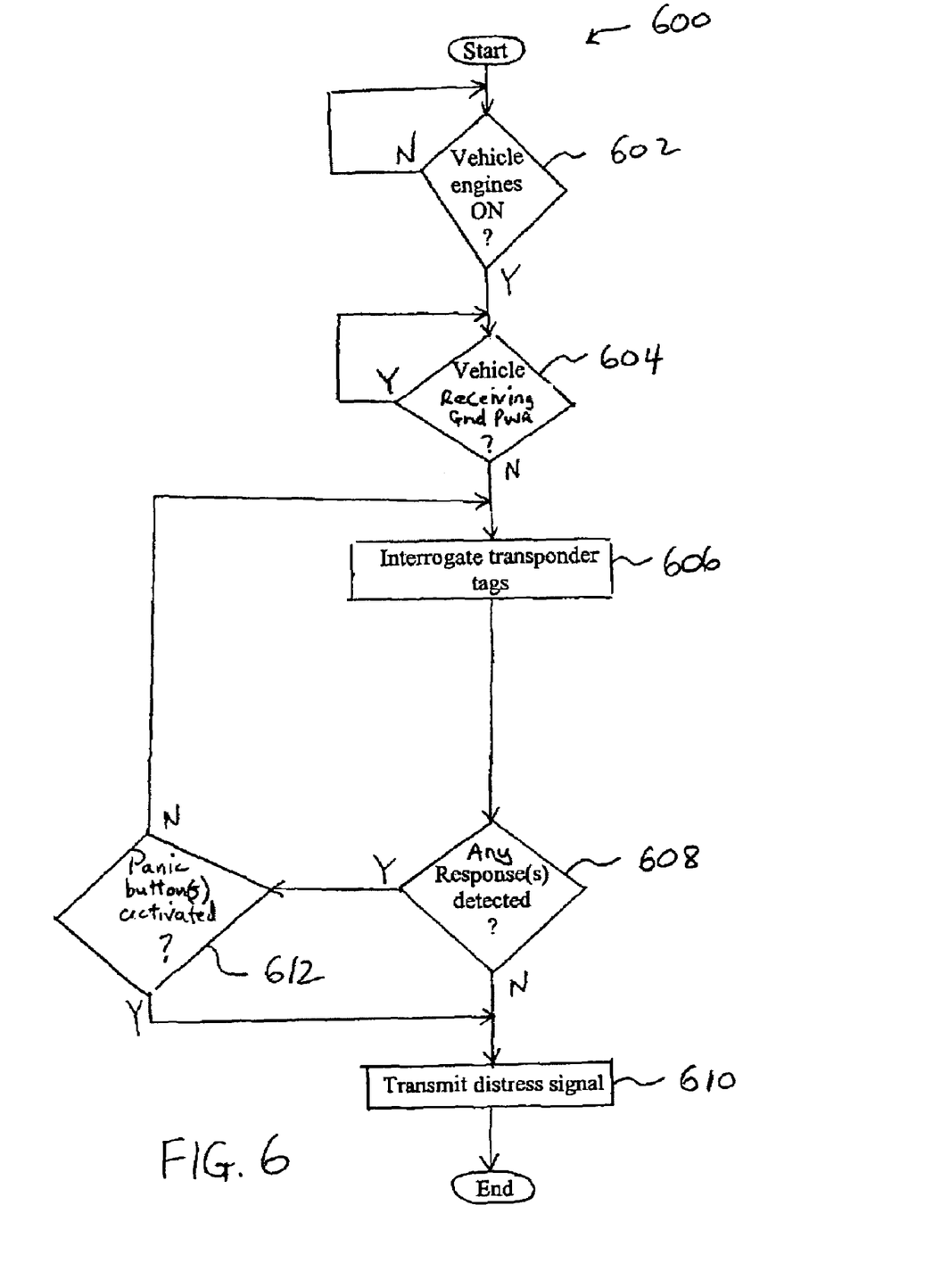
FIG. 6 is a flow chart of an example method of the present invention.

FIG. 6 is a flow chart of an example method 600 of covertly detecting an emergency condition in a control cabin of a transportation vehicle, such as airplane cabin 104, for example, having operators who occupy designated areas under normal operating conditions. Method 600 also summarizes the processes described above in connection with FIGS. 1 and 2.

A first step 602 includes determining whether all of the vehicle engine(s) is/are ON or OFF. For example, control module 126 monitors sensed signal 213a to determine if the airplane engines are ON or OFF. If the engines are not turned ON, then flow returns to the start.

Otherwise, if the engines are turned ON, flow proceeds to an optional next step 604, applicable to the airplane example described above, which includes determining whether the vehicle is connected to ground power. For example, control module 126 monitors sensed signal 213b for the presence of ground power. Ground power may be provided to airplane 102 while the airplane is grounded and being serviced at an airport, for example. If ground power is present, then flow proceeds back to step 604.

Otherwise, if ground power is not present, then flow proceeds to a next step 606, which includes interrogating transponder tags attached to the operators. For example, interrogator units 124 transmit signals 210 to interrogate corresponding transponder tags 130.

A next step 608 includes determining whether any transponder tag responses are detected. For example, interrogator units 124 listen for response signals 212 from tags 130. If any of response signals 212 is/are not detected, i.e., is/are absent, for longer than a predetermined maximum time, then the corresponding interrogator unit(s) send RSA messages to control module 126 indicating the absence of the corresponding response signal (and thus, transponder tag). In an embodiment where transponder tags 130 include panic buttons (348), the absence of a response signal may result from a pilot striking the transponder tag panic button.

If no transponder tag responses are detected, then flow proceeds to a next step 610, which includes transmitting a distress signal. For example, if all of interrogator units 124 send substantially concurrent RSA messages to control module 126 because none of response signals 212 are detected, then control module 126 issues the "All Pilots Absent" distress message to radio 120, and radio 120 transmits the distress message to ground station 106.

If at least one transponder tag response is detected at step 608, then flow proceeds to a next step 612, which includes determining whether any panic buttons have been activated. For example, if control module 126 has not received concurrent RSA messages from all of interrogator units 124, then control module 126 determines if any of panic buttons 140 have been activated. If any of the panic buttons have been activated, then flow proceeds to step 610, and the distress signal "Panic Button Activated" is transmitted.

Otherwise, if none of panic buttons 140 have been activated, flow proceeds back to step 606.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of covertly detecting and reporting a distress condition in a control cabin of a vehicle, the cabin having designated areas expected to be occupied by respective operators under normal operating conditions of the vehicle, wherein the cabin includes cabin-installed, mechanically activated panic buttons each positioned within or near to a respective one of the designated areas for access by the respective operator, comprising:
    (a) attaching to each operator a transponder tag configured to wirelessly transmit a response signal, unique to the operator to which it is attached, responsive to an interrogator signal;
    (b) wirelessly transmitting interrogator signals into the designated areas;
    (c) attempting to detect response signals, if any, from the transponder tags;
    (d) only if all of the response signals are concurrently not detected, then wirelessly transmitting a first distress signal from the vehicle,
    (e) determining if any of the panic buttons are activated; and
    (f) if at least one of the panic buttons is activated and at least one of the response signals is detected, then transmitting a second distress signal from the vehicle.

2. The method of claim 1, further comprising repeating steps (b) through (f) until either (i) at least one of the panic buttons is activated, or (ii) all of the response signals are not detected concurrently.

3. The method of claim 1, wherein the vehicle includes one or more engines, the method further comprising, before step (a):
    determining if all of the one or more engines are turned on; and
    performing steps (a) through (d) only if it is determined that all of the one or more vehicle engines are turned on.

4. The method of claim 1, wherein step (b) comprises:
    wirelessly transmitting a first of the interrogator signals from a first fixed position into a first of the designated areas between a first operator seat and an operator consol of the vehicle; and
    wirelessly transmitting a second of the interrogator signals from a second fixed position into a second of the designated areas between a second operator seat and the operator console.

5. The method of claim 4, wherein the vehicle is an airplane, the operators include a first pilot and a second pilot of the airplane, and the cabin is a cockpit of the airplane, wherein step (b) comprises:

wirelessly transmitting the first of the interrogator signals from a cockpit flight console toward a first pilot seat for the first pilot; and wirelessly transmitting the second of the interrogator signals from the cockpit flight console toward a second pilot seat for the second pilot.

6. The method of claim 5, wherein step (b) further comprises:

wirelessly transmitting the first of the interrogator signals toward the first pilot seat using a first directive antenna; and wirelessly transmitting the second of the interrogator signals toward the second pilot seat using a second directive antenna.

7. The method of claim 4, wherein the vehicle is an airplane, the operators include a first pilot and a second pilot of the airplane, and the cabin is a cockpit of the airplane, wherein step (b) comprises:

wirelessly transmitting the first of the interrogator signals from a first pilot seat for the first pilot; and wirelessly transmitting the second of the interrogator signals from a second pilot seat for the second pilot.

8. The method of claim 4, wherein step (b) further comprises wirelessly transmitting each of the first and second interrogator signals at a power level of less than or equal to 0.1 Watts.

9. The method of claim 8, wherein step (b) further comprises wirelessly transmitting each of the first and second interrogator signals in a frequency range of about 800 to 1000 MHz.

10. The method of claim 1, wherein the vehicle is an airplane, the operators include a first pilot and a second pilot of the airplane, and the cabin is a cockpit of the airplane.

11. The method of claim 1, comprising:

wirelessly transmitting at least one uniquely encoded response signal responsive to at least one of the interrogator signals.

12. The method of claim 1, wherein step (d) comprises wirelessly transmitting a distress message formatted to indicate that all of the operators are absent from their designated areas in the cabin.

13. A method of covertly detecting and reporting a distress condition in a cockpit of an airplane, the cockpit having designated areas expected to be occupied by respective pilots under normal operating conditions of the vehicle, wherein the cockpit includes cockpit-installed, mechanically activated panic buttons each positioned within or near to a respective one of the designated areas for access by the respective pilot, comprising:

(a) attaching to each pilot a transponder tag configured to wirelessly transmit a response signal, unique to the pilot to which it is attached, responsive to an interrogator signal;

(b) wirelessly transmitting interrogator signals into the designated areas;

(c) attempting to detect response signals, if any, from the transponder tags;

(d) only if all of the response signals are concurrently not detected, then wirelessly transmitting a first distress signal from the aircraft, (e) determining if any of the panic buttons are activated; and (f) if at least one of the panic buttons is activated and at least one of the response signals is detected, then transmitting a second distress signal from the airplane.

14. A system for covertly detecting and reporting an emergency condition in a control cabin of a vehicle, the cabin having designated areas expected to be occupied by respective operators under normal operating conditions of the vehicle, comprising:

transponder tags each configured to
(i) be attached to a respective operator, and
(ii) wirelessly transmit a response signal, uniquely encoded to identify the operator to which it is attached, responsive to an interrogator signal; interrogator units, each including
a transmitter configured to wirelessly transmit an interrogator signal,
a receiver configured to detect a wireless response signal if received, and
a controller, coupled with the receiver, configured to issue a result message
indicating whether a response signal is detected;
mechanically activated panic buttons each positioned within a respective one of the designated areas for access by the respective operator;
a control module, coupled with each of the panic buttons and the interrogator units, configured to
(a) issue a first distress message only when the result messages issued from all of the interrogators indicate that all of the response signals are not detected concurrently,
(b) determine if any of the panic buttons are activated, and
(c) issue a second distress message when at least one of the panic buttons is activated and at least one of the response signals is detected; and
a radio configured to wirelessly transmit the first and second distress messages.

15. The system of claim 14, wherein:
a first of the interrogator units is
mounted to an operator panel of the cabin, and
configured to transmit a first of the interrogator signals toward a first operator seat;
a second of the interrogator units is
mounted to the operator panel of the cabin, and
configured to transmit a second of the interrogator signals toward a second operator seat.

16. The system of claim 15, wherein each of the interrogator units includes a directional transmit antenna having maximum antenna gain directed toward a respective one of the operator seats.

17. The system of claim 14, wherein the vehicle is an airplane, the operators include a first pilot and a second pilot of the airplane, and the cabin is a cockpit of the airplane.

18. The system of claim 17, wherein:
a first of the interrogator units is
mounted to a first portion of a cockpit control console, and
configured to transmit a first of the interrogator signals toward a first pilot seat for the first pilot; and
a second of the interrogator units is
mounted to a second portion of the cockpit control console, and
configured to transmit a second of the interrogator signals toward a second pilot seat for the second pilot.

19. The system of claim 17, wherein:
a first of the interrogator units is
mounted to a first pilot seat for the first pilot, and
configured to transmit a first of the interrogator signals from the first pilot seat into a first of the designated regions; and
a second of the interrogator units is mounted to a second pilot seat for the second pilot, and, configured to transmit a second of the interrogator signals from the second pilot seat into a second of the designated regions.

20. The system of claim 14, wherein each of the transponder tags is a passive tag type transponder configured to derive its full operating power from one of the interrogator signals.

21. The system of claim 14, wherein the controller of each of the interrogator units is configured to issue a message to the control module indicating that the corresponding uniquely encoded response signal is absent when the corresponding response signal has not been detected for more than a predetermined maximum time period.

22. A system for covertly detecting and reporting an emergency condition in a cockpit of an airplane, the cockpit having designated areas, between a cockpit control console and pilot seats, expected to be occupied by respective pilots under normal operating conditions of the airplane, comprising:

transponder tags each configured to (i) be attached to a respective pilot, and (ii) wirelessly transmit a response signal, uniquely encoded to identify the pilot to which it is attached, responsive to an interrogator signal;

interrogator units each mounted to either a respective portion of the cockpit control console that faces a respective pilot seat, or a respective pilot seat, each of the interrogator units including a transmitter configured to wirelessly transmit an interrogator signal, a receiver configured to detect a wireless response signal from a corresponding one only of the transponder tags, and a controller, coupled with the receiver, configured to issue a result message indicating whether the response signal is detected;

mechanically activated panic buttons each positioned within a respective one of the designated areas for access by the respective pilot;

a control module, coupled with each of the panic buttons and the interrogator units, configured to (a) issue a first distress message only when the result messages issued from all of the interrogators indicate that all of the response signals are not detected concurrently, (b) determine if any of the panic buttons are activated, and (c) issue a second distress message when at least one of the panic buttons is activated and at least one of the response signals is detected; and a radio configured to wirelessly transmit the first and second distress messages.

* * * * *